Patented Aug. 7, 1945

2,381,526

UNITED STATES PATENT OFFICE 2,381,526

VULCANIZABLE POLYMERIZATION PRODUCTS

Monte C. Throdahl, Nitro, W. Va., assignor to Monsanto Chemical Company, St. Louis, Mo., a corporation of Delaware No Drawing. Application February 4, 1943, Serial No. 474,689

6 Claims. (Cl. 260—36)

The present invention relates to a process of rendering vulcanizable polymers soft and tacky and more amenable to processing and to the products obtained thereby. The invention relates particularly to treating synthetic polymers.

Synthetic sulfur vulcanizable polymers are known which resemble natural rubber in physical properties. However, most of them have a dry surface and are strong and tough even in the unvulcanized state. Much time is consumed in the milling operation and the dry surface prevents the proper adherence of layers required in the manufacture of laminated articles as for example pneumatic tires. It is an object of this invention to provide a method by which a synthetic sulfur vulcanizable polymer may be made soft and pliable and the surface rendered tacky. Another object is to provide a new and improved class of softening, tackifying and plasticizing agents. Other and further objects will in part be apparent and in part particularly pointed out in the description following.

The most important synthetic sulfur vulcanizable polymers are co-polymers of butadiene 1,3 and suitable vinyl compounds made by polymerizing in aqueous emulsion a mixture of the two unsaturates. The co-polymer of butadiene and styrene, known as Buna S was designed primarily for use in the tread portion of pneumatic tires and yet is notoriously lacking in surface tack and softness. While the present invention is for that reason primarily concerned with the Buna S type of rubber, it is to be understood that the new softening agents may be used to treat other rubber like materials as for example chlor butadiene polymers known commercially as neoprenes, the co-polymers of butadiene 1,3 and acrylic nitrile also known under the trade names of Hycar OR, Perbunan and Thiokol RD, sodium butadiene polymers, dimethyl butadiene polymers and natural rubbers to achieve modifications of varying degrees in the physical properties thereof. They may also be used to plasticize synthetic resins whether vulcanizable or not. By the terms "rubbers" or "a rubber" in the present specification is meant a vulcanizable plastic material which like natural rubber possesses marked extensibility under load coupled with the property of forcibly retracting to approximately its original size and shape after the load is removed. It has been suggested that "elastomer" would be a better term for this class of products.

In accordance with the present invention it has been discovered that the condensation products of ketones and aliphatic amines are highly useful for treating a rubber composition to soften it and provide a tacky surface. Preferred are the condensation products of an aliphatic ketone and an aliphatic primary amine containing a hydroxy or another primary amino substituent in the beta position. Both the hydroxy group and the amino group or both amino groups are believed to undergo condensation with the ketone forming a heterocyclic ring compound. However, it appears that a mixture of compounds is usually formed and it has not yet been possible to identify positively the constituents present. Accordingly, the present invention is not limited to any theory of the reaction taking place but pertains broadly to the reaction products as set forth. In this connection, the composite reaction products obtained after removing unreacted constituents have been found to give satisfactory results although further purification may be instituted where desired.

The condensation of a ketone with an aliphatic amine can be effected by following substantially the procedures known for condensing ketones and aromatic amines. In general, the ketone and aliphatic amine are heated in the presence of a condensation catalyst as for example iodine, sulfuric acid, hydrochloric acid, aluminum chloride, zinc chloride, hydroiodic acid, hydrobromic acid, bromine, benzene sulfonic acid, p-toluene sulfonic acid and the like, water being split out by the reaction. Examples of suitable ketones are acetone, diacetone alcohol, mesityl oxide, phorone, iso phorone, methyl ethyl ketone, acetophenone, benzophenone, diethyl ketone, dibutyl ketone, methyl isopropyl ketone, di-isopropyl ketone, dibenzyl ketone, benzoyl acetone, hydracetyl acetone, mono chlor acetone, dichlor acetone, aldol acetone, ethylidene acetone, allyl acetone, furfural acetone, formaldehyde acetone, hydroxy benzal acetone, hydroxy acetone, cyclopentanone, cyclohexanone and equivalents and analogues thereof. Suitable amines comprise ethanol amine, isopropanol amine, hydroxy ethyl ethylene diamine, ethylene diamine, ethylene triamine, n-butyl amine, ethyl amine, 2 amino 1 butanol and equivalents and analogues thereof.

The following examples describe in detail the preparation of the new softening and plasticizing agents but they are not to be construed as limitative of the invention for this invention pertains to treating a rubber and rubber compositions with the new adjuvants regardless of the method of their preparation.

Example I

Into a reactor of suitable capacity there was charged substantially 122 parts by weight of monoethanolamine and substantially 16 parts by weight of crude benzene sulfonic acid. The latter was a technical grade containing approximately 75 percent benzene sulfonic acid, the remainder being sulfuric acid, 20 percent and water, 5 percent. The reaction vessel was fitted with an inlet tube for acetone vapor which extended nearly to the bottom of the vessel and with a packed column in which the unreacted ethanolamine was condensed and separated from unreacted acetone and returned to the reactor. The top of the column led into a delivery tube which carried the unreacted acetone to the bottom of an acetone vaporizer where it was dried and recirculated.

Into a second vessel of suitable capacity which served as an acetone vaporizer there was charged 170 parts by weight of acetone. In addition to the delivery tube for the acetone returned from the reactor the vaporizer also bore a column for separating water from the acetone vapor. Where desired suitable drying agents may be employed either in the column or in the vaporizer proper. From the column the dry acetone vapor passed into the acetone inlet tube of the reactor and at the junction a reflux condenser was introduced into the system for venting.

The reaction mixture was kept at 110–130° for about 56 hours during which time dry acetone vapor was circulated through the reaction chamber. Fresh acetone was added to the vaporizer as needed. Thus, after 42 hours substantially 100 parts by weight of new acetone was added to the vaporizer. When acetone was no longer absorbed in the reactor the catalyst and any unreacted constituents were removed in suitable manner. For example, the contents of the reaction vessel were heated under diminished pressure to distill out ethanolamine, water and other low boiling constituents. The distillation was stopped when the vapor temperature reached 96° C. at 5 mm. pressure.

The catalyst was removed from the ethanolamine free reaction product by digesting with 126 parts by weight of 5% caustic soda at 85° C. for about an hour. The aqueous alkaline layer was withdrawn and the oily organic layer washed with water until free from caustic soda. The oil layer was finally dried either by heating under reduced pressure or by treating with suitable dehydrating agents or by other suitable means. Further purification of the product is unnecessary but where a higher purity is desired the product may be distilled under reduced pressure. A light mobile liquid B. P. 90–108° C./4 mm. is obtained. The weight of the final product indicates that three moles of acetone combine with one mole of ethanolamine, presumably with the elimination of three moles of water.

Example II

Into a reaction vessel of suitable capacity fitted with a reflux condenser there was charged substantially 50 parts by weight of 60% ethylene diamine, 130 parts by weight of acetone and 4 parts by weight of substantially pure benzene sulfonic acid. The catalyst was added to the acetone and the amine slowly added to the mixture of catalyst and acetone in order to avoid too rapid a rise in temperature. The charge was then heated to refluxing temperature for approximately 70 hours and unreacted ingredients and water removed by distillation first by heating up to 70° C. under atmospheric pressure and then under 10 mm. pressure until the vapor temperature reached 82° C. The catalyst was washed from the residue and the product remaining used directly as a softener and tackifying agent as hereinafter described. As in the case of ethanolamine the weight indicated that three moles of acetone condensed with one mole of the amine.

Example III

Into a reaction vessel fitted with a reflux condenser there was charged substantially 100 parts by weight of isophorone, 30 parts of weight of ethanolamine and 4 parts by weight of substantially pure benzene sulfonic acid. The charge was heated at 110–120° C. for about 55 hours and unreacted ingredients and water removed by distillation up to a vapor temperature of 115° C./4 mm. The residue was washed free from catalyst leaving a viscous oil.

Example IV

Into a reaction vessel fitted with a reflux condenser there was charged substantially 52 parts by weight of acetophenone, 26 parts by weight of ethanolamine and 1 part by weight of iodine. The charge was heated at 110–130° C. for approximately 75 hours and unreacted ingredients removed by distillation up to a vapor temperature of 80° C./4 mm. The catalyst was washed out by means of dilute caustic soda.

Example V

Substantially 61 parts by weight of ethanolamine and 130 parts by weight of aceto acetic ester were charged into a suitable container. After standing several hours the mixture was dissolved in ether or other solvent and 70 parts by weight of potassium carbonate added. The charge was allowed to stand for one week and then filtered, the filter cake washed with ether and the solvent removed from the combined filtrate and washings. The residue was used without attempting further purification. The reaction product of acetonyl acetone and ethanolamine was prepared substantially as described above.

Example VI

Into a reaction vessel carrying a reflux condenser there was charged substantially 73 parts by weight of n-butyl amine, 2 parts by weight of iodine and 130 parts by weight of acetone. The mixture was heated under reflux for about 96 hours, then the water, unreacted acetone and butyl amine removed by distillation under diminished pressure. The residue was employed directly.

As illustrative of the use of the new softening and tackifying agents representative members of the class were incorporated into a typical rubber base formula containing as the rubber ingredient the co-polymer of butadiene and styrene known as Buna S. The surface tack of the compositions so prepared was compared with a similar composition in which part of the synthetically prepared rubber was replaced by natural rubber. The base formula and comparative formula were compounded as follows:

|  | Base stock | Comparative formula |
|---|---|---|
| Buna S | 100 | 75.0 |
| Smoked sheet rubber |  | 25.0 |
| Channel black | 55.0 | 55.0 |

Note was made of the condition of the surface of stocks prepared by adding 5 parts by weight of the preferred adjuvants to the base stock. The plasticity or resistance to flow of the stocks was measured by means of an extrusion plastometer. A description of the method and apparatus is given by J. H. Dillon, Rubber Chemistry and Technology, volume 9, (1936) pages 496–501. The test pellets were preheated 24 minutes at 90° C. and then inserted immediately into the plastometer, the temperature of the latter being maintained within the range of 82–85° C. The quantity measured was the time in seconds required to extrude a given volume of the rubber composition at constant temperature and under a constant pressure. A summary of the plasticity and surface tack of the various compositions is set forth in the table below:

Table I

| Additive agent—condensation product of— | Surface condition | Plasticity in seconds |
|---|---|---|
| Comparative formula, none | Tacky | |
| Base stock, none | Dry nontacky | 88.5 |
| Acetone-ethanolamine | Very tacky | 40.0 |
| Acetone-isopropanol amine | Tacky | |
| Methyl ethyl ketone-ethanolamine | do | 23.0 |
| Acetone-hydroxy ethyl ethylene diamine | do | 43.0 |
| Acetone-ethylene diamine | Very tacky | 33.5 |
| Acetone-2-amino 1-butanol | Tacky | 18.4 |
| Mesityl oxide-ethanolamine | do | |
| Isophorone-ethanolamine | do | 42.5 |
| Acetophenone-ethanolamine | do | |
| Aceto acetic ester-ethanolamine | do | |

It was further found that not only were the compositions containing the new adjuvants soft, tacky and pliable but the sheeted stocks exhibited much less curling and shrinking on standing than did the base stock. The addition of vulcanizing ingredients as for example 5 parts zinc oxide, 2 parts pine tar, 2 parts stearic acid, 2 parts sulfur and 1 part cyclohexylamino thiobenzothiazole did not noticeably alter the surface condition or plasticity of the stocks and after heating in a press in the usual manner normal vulcanizates were obtained in each case. Reducing the amount of softening agent to 2 parts by weight gave stocks of substantially the same surface condition as those containing the higher proportion but for good extrusion characteristics 5 parts on the rubber or even higher proportions are more desirable. The resistance to flow is then greatly reduced as shown by the foregoing data although definite improvements were observed using the lower amounts found sufficient for good surface characteristics. The amounts used can be varied widely depending upon the rubber and the particular properties sought. For example 15 parts by weight on the rubber of either the condensation product of acetone and n-butyl amine or the condensation product of aceto acetic ester and ethanolamine effectively plasticize the rubber obtained by co-poylmerizing butadiene 1,3 and acrylic nitrile and are equivalent to the most effective agents known for that purpose.

The ketone-aliphatic amine condensations of this invention exert such a powerful softening effect in natural rubber, particularly on the surface, that they are suitable for the manufacture of adhesives therefrom or are useful where for other reasons it is desired to prepare a highly tacky composition from natural rubber. The effect is not so pronounced at room temperature but is brought out by slight heating. Compositions containing 0.5 part by weight on the rubber of a ketone-aliphatic amine condensation product are rendered very sticky and tacky after heating the mixture for 24 minutes at 90° C.

The following are further specific embodiments of the invention illustrating the use of the preferred condensation products in another type of rubber but again are not limitative of the invention. Stocks were compounded comprising

| | Stock | | | | |
|---|---|---|---|---|---|
| | A | B | C | D | E |
| | Parts by weight | Parts by weight | Parts by weight | Parts by weight | Parts by weight |
| Chlor butadiene 1,3 polymer | 100 | 100 | 100 | 100 | 100 |
| Magnesium oxide | 4 | 4 | 4 | 4 | 4 |
| P-33 carbon black | 30 | 30 | 30 | 30 | 30 |
| Zinc oxide | 5 | 5 | 5 | 5 | 5 |
| Phenyl beta naphthylamine | 2 | 2 | 2 | 2 | 2 |
| Condensation product of acetone and ethanolamine | | 5 | | | |
| Condensation product of aceto acetic ester and ethanolamine | | | 5 | | |
| Condensation product of acetonyl acetone and ethanolamine | | | | 5 | |
| Condensation product of acetophenone and ethanolamine | | | | | 5 |

From the stocks so compounded test pellets were cut by means of a suitable die and the plasticity or resistance of the pellets to flow was measured by means of an extrusion plastometer as described above. The test pellets were preheated 9 minutes at 90° C. and then inserted immediately into the plastometer, the temperature of the latter being maintained within the range of 82–85° C. The results are set forth below:

Table II

| Stock | Plasticity in seconds |
|---|---|
| A | 31 |
| B | 15.5 |
| C | 2.4 |
| D | 2.5 |
| E | 16 |

The striking decrease in the resistance to flow brought about by the addition of the ketone-aliphatic amine condensates to the chlor butadiene rubber is evident upon comparing the extrusion times with the time required to extrude the A stock which contained no softener.

The condensation products of ketones and aliphatic amines possess antioxidant properties and also have the property of preventing the further polymerization of vulcanizable polymers prepared synthetically in aqueous emulsion. Accordingly, it has been found advantageous to add them to the latex of the synthetic polymer immediately after completion of the polymerization step. Subsequent coagulation of the rubber constituents provides a stable tacky rubbery product amenable to processing. Furthermore, the preferred condensation products may be added to the emulsions before polymerization. Where addition is made to an emulsion it is recommended that a compatible emulsion of the ketone-aliphatic amine condensation product first be prepared and the emulsion mixed. In this way uniform distribution and maximum effectiveness is assured. Another highly important property imparted to a rubber by the preferred adjuvants is resistance to flex cracking. The results of tests on cured pieces of a stock composed of Buna S 100, Channel Black 55, zinc oxide 5, sulfur 2, stearic acid 2, pine tar 2, cyclohexyl amino thiobenzothiazole 1 and the condensation product of acetone and ethanolamine 5 (all parts by weight) showed that after aging 15 hours at 250° F. in a bomb under 80 pounds air pressure per square inch the flexings were from 5 to 10 times greater than those of a similar stock without the ketone-aliphatic amine condensation product. The number of flexings was determined on a flexing machine as described by L. V. Cooper, Analytical Edition of Industrial and Engineering Chemistry, vol 2, No. 4, 1930, pages 391-394.

As set forth above a number of beneficial effects are achieved by treating a rubber with the condensation product of a ketone and an aliphatic amine. It is to be understood that the term "treating" as employed in the appended claims is used in a generic sense to include either the incorporating of the preferred class of materials into a rubber by milling or similar process or their addition to the latex of a rubber before its coagulation or the application thereof to the surface of a mass of a crude rubber.

The invention is not limited to the specific embodiments set forth above. The new softening agents may be employed in different proportions and in conjunction with other compounding and vulcanizing ingredients than those specifically mentioned. Obviously, many variations can be made without departing from the spirit or scope of this invention. The present invention is limited solely by the claims attached hereto as part of the present specification.

What is claimed is:

1. A composition comprising an unvulcanized rubber like polymer of a butadiene-1,3 compound and the condensation product of a ketone and a primary aliphatic amine.

2. A composition comprising an unvulcanized rubber like polymer of a butadiene-1,3 compound and the condensation product of an aliphatic ketone and an aliphatic primary amine.

3. A composition comprising an unvulcanized rubber like polymer of a butadiene-1,3 compound and the condensation product of acetone and a primary aliphatic amine.

4. A composition comprising unvulcanized copolymer of butadiene-1,3 and styrene rubber and the condensation product of a ketone and an aliphatic primary amine.

5. A composition comprising unvulcanized copolymer of butadiene-1,3 and styrene rubber and the condensation product of three molecular proportions of acetone and one molecular proportion of ethanolamine.

6. A composition comprising unvulcanized copolymer of butadiene-1,3 and styrene rubber and the condensation product of three molecular proportions of acetone and one molecular proportion of ethylene diamine.

MONTE C. THRODAHL.